(12) United States Patent
Bilcke

(10) Patent No.: US 6,707,267 B2
(45) Date of Patent: *Mar. 16, 2004

(54) METHOD AND A DRIVE MEANS TO DRIVE A MACHINE

(75) Inventor: Walter Bilcke, Geluveld (BE)

(73) Assignee: Picanol N.V., Iper (BE)

( * ) Notice: Subject to any disclaimer, the term of this patent is extended or adjusted under 35 U.S.C. 154(b) by 0 days.

This patent is subject to a terminal disclaimer.

(21) Appl. No.: 10/365,493

(22) Filed: Feb. 13, 2003

(65) Prior Publication Data

US 2003/0128004 A1 Jul. 10, 2003

Related U.S. Application Data

(63) Continuation of application No. 09/554,757, filed on May 19, 2000, now Pat. No. 6,525,496.

(51) Int. Cl.[7] ................................................ H02P 7/00
(52) U.S. Cl. ...................................................... 318/432
(58) Field of Search ................................ 318/432, 437, 318/561, 433, 609–611, 686, 687, 443; 388/805, 813, 820; 139/1

(56) References Cited

U.S. PATENT DOCUMENTS

| 4,755,123 A | 7/1988 | Otake |
| 4,980,623 A | 12/1990 | Anton |
| 5,306,993 A | 4/1994 | De Fries et al. |
| 5,559,412 A | 9/1996 | Schuler |
| 5,755,267 A | 5/1998 | Eberhard et al. |
| 6,525,496 B1 * | 2/2003 | Bilcke .................. 318/432 |

* cited by examiner

Primary Examiner—Robert Nappi
Assistant Examiner—Renata McCloud
(74) Attorney, Agent, or Firm—Bacon & Thomas, PLLC

(57) ABSTRACT

A machine includes an electric drive motor and at least one component carrying out a periodic motion. The machine is configured to control the drive motor in such a manner that it applies a predetermined torque to the machine.

16 Claims, 8 Drawing Sheets

Fig. 2

| W | T | A | F |
|---|---|---|---|
| W1 | T1 | A1 | F1 |
| W2 | T1 | A2 | F2 |
| W3 | T1 | A3 | F3 |
| W4 | T1 | A4 | F4 |
| W5 | T1 | A5 | F5 |
| W6 | T1 | A6 | F6 |
| ... | ... | ... | ... |
| W100 | T1 | A100 | F100 |
| W1 | T2 | A101 | F101 |
| W2 | T2 | A102 | F102 |
| W3 | T2 | A103 | F103 |
| W4 | T2 | A104 | F104 |
| W5 | T2 | A105 | F105 |
| W6 | T2 | A106 | F106 |
| ... | ... | ... | ... |
| W100 | T2 | A200 | F200 |
| ... | ... | ... | ... |
| W1 | T50 | A4901 | F4901 |
| W2 | T50 | A4902 | F4902 |
| W3 | T50 | A4903 | F4903 |
| W4 | T50 | A4904 | F4904 |
| W5 | T50 | A4905 | F4905 |
| W6 | T50 | A4906 | F4906 |
| ... | ... | ... | ... |
| W100 | T50 | A5000 | F5000 |
| ... | ... | ... | ... |
| W1 | T100 | A9901 | F9901 |
| W2 | T100 | A9902 | F9902 |
| W3 | T100 | A9903 | F9903 |
| W4 | T100 | A9904 | F9904 |
| W5 | T100 | A9905 | F9905 |
| W6 | T100 | A9906 | F9906 |
| ... | ... | ... | ... |
| W100 | T100 | A10000 | F10000 |

Fig. 3

| P | TT |
|---|---|
| P1 | TT1 |
| P2 | TT2 |
| P3 | TT3 |
| P4 | TT4 |
| P5 | TT5 |
| P6 | TT6 |
| P7 | TT7 |
| P8 | TT8 |
| P9 | TT9 |
| P10 | TT10 |
| P11 | TT11 |
| P12 | TT12 |
| P13 | TT13 |
| P14 | TT14 |
| P15 | TT15 |
| P16 | TT16 |
| P17 | TT17 |
| P18 | TT18 |
| P19 | TT19 |
| P20 | TT20 |
| ... | ... |
| P400 | TT400 |
| P401 | TT401 |
| P402 | TT402 |
| P403 | TT403 |
| P404 | TT404 |
| P405 | TT405 |
| P406 | TT406 |
| P407 | TT407 |
| P408 | TT408 |
| P409 | TT409 |
| P410 | TT410 |
| ... | ... |
| P1070 | TT1070 |
| P1071 | TT1071 |
| P1072 | TT1072 |
| P1073 | TT1073 |
| P1074 | TT1074 |
| P1075 | TT1075 |
| P1076 | TT1076 |
| P1077 | TT1077 |
| P1078 | TT1078 |
| P1079 | TT1079 |
| P1080 | TT1080 |

Fig. 4

| P | TA | TB | TC | TD | TE | TF | TG |
|---|---|---|---|---|---|---|---|
| P1 | TA1 | TB1 | TC1 | TD1 | TE | TF | TG |
| P2 | TA2 | TB2 | TC2 | TD2 | TE | TF | TG |
| P3 | TA3 | TB3 | TC3 | TD3 | TE | TF | TG |
| P4 | TA4 | TB4 | TC4 | TD4 | TE | TF | TG |
| P5 | TA5 | TB5 | TC5 | TD5 | TE | TF | TG |
| P6 | TA6 | TB6 | TC6 | TD6 | TE | TF | TG |
| P7 | TA7 | TB7 | TC7 | TD7 | TE | TF | TG |
| P8 | TA8 | TB8 | TC8 | TD8 | TE | TF | TG |
| P9 | TA9 | TB9 | TC9 | TD9 | TE | TF | TG |
| P10 | TA10 | TB10 | TC10 | TD10 | TE | TF | TG |
| P11 | TA11 | TB11 | TC11 | TD11 | TE | TF | TG |
| P12 | TA12 | TB12 | TC12 | TD12 | TE | TF | TG |
| P13 | TA13 | TB13 | TC13 | TD13 | TE | TF | TG |
| P14 | TA14 | TB14 | TC14 | TD14 | TE | TF | TG |
| P15 | TA15 | TB15 | TC15 | TD15 | TE | TF | TG |
| P16 | TA16 | TB16 | TC16 | TD16 | TE | TF | TG |
| P17 | TA17 | TB17 | TC17 | TD17 | TE | TF | TG |
| P18 | TA18 | TB18 | TC18 | TD18 | TE | TF | TG |
| P19 | TA19 | TB19 | TC19 | TD19 | TE | TF | TG |
| P20 | TA20 | TB20 | TC20 | TD20 | TE | TF | TG |
| ... | ... | ... | ... | ... | ... | ... | ... |
| P400 | TA400 | TB400 | TC400 | TD400 | TE | TF | TG |
| P401 | TA401 | TB401 | TC401 | TD401 | TE | TF | TG |
| P402 | TA402 | TB402 | TC402 | TD402 | TE | TF | TG |
| P403 | TA403 | TB403 | TC403 | TD403 | TE | TF | TG |
| P404 | TA404 | TB404 | TC404 | TD404 | TE | TF | TG |
| P405 | TA405 | TB405 | TC405 | TD405 | TE | TF | TG |
| P406 | TA406 | TB406 | TC406 | TD406 | TE | TF | TG |
| P407 | TA407 | TB407 | TC407 | TD407 | TE | TF | TG |
| P408 | TA408 | TB408 | TC408 | TD408 | TE | TF | TG |
| P409 | TA409 | TB409 | TC409 | TD409 | TE | TF | TG |
| P410 | TA410 | TB410 | TC410 | TD410 | TE | TF | TG |
| ... | ... | ... | ... | ... | ... | ... | ... |
| P1070 | TA1070 | TB1070 | TB1070 | TD1070 | TE | TF | TG |
| P1071 | TA1071 | TB1070 | TB1070 | TD1071 | TE | TF | TG |
| P1072 | TA1072 | TB1070 | TB1070 | TD1072 | TE | TF | TG |
| P1073 | TA1073 | TB1070 | TB1070 | TD1073 | TE | TF | TG |
| P1074 | TA1074 | TB1070 | TB1070 | TD1074 | TE | TF | TG |
| P1075 | TA1075 | TB1070 | TB1070 | TD1075 | TE | TF | TG |
| P1076 | TA1076 | TB1070 | TB1070 | TD1076 | TE | TF | TG |
| P1077 | TA1077 | TB1070 | TB1070 | TD1077 | TE | TF | TG |
| P1078 | TA1078 | TB1070 | TB1070 | TD1078 | TE | TF | TG |
| P1079 | TA1079 | TB1070 | TB1070 | TD1079 | TE | TF | TG |
| P1080 | TA1080 | TB1070 | TB1070 | TD1080 | TE | TF | TG |

Fig. 5

| P | WW |
|---|---|
| P1 | WW1 |
| P2 | WW2 |
| P3 | WW3 |
| P4 | WW4 |
| P5 | WW5 |
| P6 | WW6 |
| P7 | WW7 |
| P8 | WW8 |
| ... | ... |
| P200 | WW200 |
| P201 | WW201 |
| P202 | WW202 |
| P203 | WW203 |
| P204 | WW204 |
| P205 | WW205 |
| P206 | WW206 |
| ... | ... |
| P274 | WW274 |
| P275 | WW275 |
| P276 | WW276 |
| P277 | WW277 |
| P278 | WW278 |
| P279 | WW279 |
| P280 | WW280 |
| ... | ... |
| P400 | WW400 |
| P401 | WW401 |
| P402 | WW402 |
| P403 | WW403 |
| P404 | WW404 |
| P405 | WW405 |
| P406 | WW406 |
| ... | ... |
| P1072 | WW1072 |
| P1073 | WW1073 |
| P1074 | WW1074 |
| P1075 | WW1075 |
| P1076 | WW1076 |
| P1077 | WW1077 |
| P1078 | WW1078 |
| P1079 | WW1079 |
| P1080 | WW1080 |

Fig. 7

| P | WW | WS |
|---|---|---|
| P1 | WW1 | |
| P2 | WW2 | |
| P3 | WW3 | |
| P4 | WW4 | |
| P5 | WW5 | |
| P6 | WW6 | |
| ... | ... | |
| P200 | WW200 | WS200 |
| P201 | WW201 | WS201 |
| P202 | WW202 | WS202 |
| P203 | WW203 | WS203 |
| P204 | WW204 | WS204 |
| P205 | WW205 | WS205 |
| P206 | WW206 | WS206 |
| ... | ... | ... |
| P275 | WW275 | WS275 |
| P276 | WW276 | WS276 |
| P277 | WW277 | WS277 |
| P278 | WW278 | WS278 |
| P279 | WW279 | WS279 |
| P280 | WW280 | WS280 |
| ... | ... | |
| P560 | WW560 | WS560 |
| P561 | WW561 | WS561 |
| P562 | WW562 | WS562 |
| P563 | WW563 | WS563 |
| P564 | WW564 | WS564 |
| P565 | WW565 | WS565 |
| ... | ... | ... |
| P635 | WW635 | WS635 |
| P636 | WW636 | WS636 |
| P637 | WW637 | WS637 |
| P638 | WW638 | WS638 |
| P639 | WW639 | WS639 |
| P640 | WW640 | WS640 |
| ... | ... | |
| P1075 | WW1075 | |
| P1076 | WW1076 | |
| P1077 | WW1077 | |
| P1078 | WW1078 | |
| P1079 | WW1079 | |
| P1080 | WW1080 | |

Fig. 6

| P | TM 80% | TM 81% | ... | TM 100% | ... | TM 119% | TM 120% |
|---|---|---|---|---|---|---|---|
| P1 | TM1-80 | TM1-81 | ... | TM1-100 | ... | TM1-119 | TM1-120 |
| P2 | TM2-80 | TM2-81 | ... | TM2-100 | ... | TM2-119 | TM2-120 |
| P3 | TM3-80 | TM3-81 | ... | TM3-100 | ... | TM3-119 | TM3-120 |
| P4 | TM4-80 | TM4-81 | ... | TM4-100 | ... | TM4-119 | TM4-120 |
| P5 | TM5-80 | TM5-81 | ... | TM5-100 | ... | TM5-119 | TM5-120 |
| P6 | TM6-80 | TM6-81 | ... | TM6-100 | ... | TM6-119 | TM6-120 |
| P7 | TM7-80 | TM7-81 | ... | TM7-100 | ... | TM7-119 | TM7-120 |
| P8 | TM8-80 | TM8-81 | ... | TM8-100 | ... | TM8-119 | TM8-120 |
| P9 | TM9-80 | TM9-81 | ... | TM9-100 | ... | TM9-119 | TM9-120 |
| P10 | TM10-80 | TM10-81 | ... | TM10-100 | ... | TM10-119 | TM10-120 |
| P11 | TM11-80 | TM11-81 | ... | TM11-100 | ... | TM11-119 | TM11-120 |
| P12 | TM12-80 | TM12-81 | ... | TM12-100 | ... | TM12-119 | TM12-120 |
| P13 | TM13-80 | TM13-81 | ... | TM13-100 | ... | TM13-119 | TM13-120 |
| P14 | TM14-80 | TM14-81 | ... | TM14-100 | ... | TM14-119 | TM14-120 |
| P15 | TM15-80 | TM15-81 | ... | TM15-100 | ... | TM15-119 | TM15-120 |
| P16 | TM16-80 | TM16-81 | ... | TM16-100 | ... | TM16-119 | TM16-120 |
| P17 | TM17-80 | TM17-81 | ... | TM17-100 | ... | TM17-119 | TM17-120 |
| P18 | TM18-80 | TM18-81 | ... | TM18-100 | ... | TM18-119 | TM18-120 |
| P19 | TM19-80 | TM19-81 | ... | TM19-100 | ... | TM19-119 | TM19-120 |
| P20 | TM20-80 | TM20-81 | ... | TM20-100 | ... | TM20-119 | TM20-120 |
| ... | ... | ... | ... | ... | ... | ... | ... |
| P400 | TM400-80 | TM400-81 | ... | TM400-100 | ... | TM400-119 | TM400-120 |
| P401 | TM401-80 | TM401-81 | ... | TM401-100 | ... | TM401-119 | TM401-120 |
| P402 | TM402-80 | TM402-81 | ... | TM402-100 | ... | TM402-119 | TM402-120 |
| P403 | TM403-80 | TM403-81 | ... | TM403-100 | ... | TM403-119 | TM403-120 |
| P404 | TM404-80 | TM404-81 | ... | TM404-100 | ... | TM404-119 | TM404-120 |
| P405 | TM405-80 | TM405-81 | ... | TM405-100 | ... | TM405-119 | TM405-120 |
| P406 | TM406-80 | TM406-81 | ... | TM406-100 | ... | TM406-119 | TM406-120 |
| P407 | TM407-80 | TM407-81 | ... | TM407-100 | ... | TM407-119 | TM407-120 |
| P408 | TM408-80 | TM408-81 | ... | TM408-100 | ... | TM408-119 | TM408-120 |
| P409 | TM409-80 | TM409-81 | ... | TM409-100 | ... | TM409-119 | TM409-120 |
| P410 | TM410-80 | TM410-81 | ... | TM410-100 | ... | TM410-119 | TM410-120 |
| ... | ... | ... | ... | ... | ... | ... | ... |
| P1070 | TM1070-80 | TM1070-81 | ... | TM1070-100 | ... | TM1070-119 | TM1070-120 |
| P1071 | TM1071-80 | TM1071-81 | ... | TM1071-100 | ... | TM1071-119 | TM1071-120 |
| P1072 | TM1072-80 | TM1072-81 | ... | TM1072-100 | ... | TM1072-119 | TM1072-120 |
| P1073 | TM1073-80 | TM1073-81 | ... | TM1073-100 | ... | TM1073-119 | TM1073-120 |
| P1074 | TM1074-80 | TM1074-81 | ... | TM1074-100 | ... | TM1074-119 | TM1074-120 |
| P1075 | TM1075-80 | TM1075-81 | ... | TM1075-100 | ... | TM1075-119 | TM1075-120 |
| P1076 | TM1076-80 | TM1076-81 | ... | TM1076-100 | ... | TM1076-119 | TM1076-120 |
| P1077 | TM1077-80 | TM1077-81 | ... | TM1077-100 | ... | TM1077-119 | TM1077-120 |
| P1078 | TM1078-80 | TM1078-81 | ... | TM1078-100 | ... | TM1078-119 | TM1078-120 |
| P1079 | TM1079-80 | TM1079-81 | ... | TM1079-100 | ... | TM1079-119 | TM1079-120 |
| P1080 | TM1080-80 | TM1080-81 | ... | TM1080-100 | ... | TM1080-119 | TM1080-120 |

Fig. 8

| P | TS | WW | TSxWW | TM-80%xWW | TM120%xWW |
|---|---|---|---|---|---|
| P1 | TS1 | WW1 | TS1xWW1 | TM1-80xWW1 | TM1-120xWW1 |
| P2 | TS2 | WW2 | TS2xWW2 | TM2-80xWW2 | TM2-120xWW2 |
| P3 | TS3 | WW3 | TS3xWW3 | TM3-80xWW3 | TM3-120xWW3 |
| P4 | TS4 | WW4 | TS4xWW4 | TM4-80xWW4 | TM4-120xWW4 |
| P5 | TS5 | WW5 | TS5xWW5 | TM5-80xWW5 | TM5-120xWW5 |
| P6 | TS6 | WW6 | TS6xWW6 | TM6-80xWW6 | TM6-120xWW6 |
| ... | ... | ... | ... | ... | ... |
| P400 | TS400 | WW400 | TS400xWW400 | TM400-80xWW400 | TM400-120xWW400 |
| P401 | TS401 | WW401 | TS401xWW401 | TM401-80xWW401 | TM401-120xWW401 |
| P402 | TS402 | WW402 | TS402xWW402 | TM402-80xWW402 | TM402-120xWW402 |
| P403 | TS403 | WW403 | TS403xWW403 | TM403-80xWW403 | TM403-120xWW403 |
| P404 | TS404 | WW404 | TS404xWW404 | TM404-80xWW404 | TM404-120xWW404 |
| P405 | TS405 | WW405 | TS405xWW405 | TM405-80xWW405 | TM405-120xWW405 |
| P406 | TS406 | WW406 | TS406xWW406 | TM406-80xWW406 | TM406-120xWW406 |
| ... | ... | ... | ... | ... | ... |
| P1070 | TS1070 | WW1070 | TS1070xWW1070 | TM1070-80xWW1070 | TM1070-120xWW1070 |
| P1071 | TS1071 | WW1071 | TS1071xWW1071 | TM1071-80xWW1071 | TM1071-120xWW1071 |
| P1072 | TS1072 | WW1072 | TS1072xWW1072 | TM1072-80xWW1072 | TM1072-120xWW1072 |
| P1073 | TS1073 | WW1073 | TS1073xWW1073 | TM1073-80xWW1073 | TM1073-120xWW1073 |
| P1074 | TS1074 | WW1074 | TS1074xWW1074 | TM1074-80xWW1074 | TM1074-120xWW1074 |
| P1075 | TS1075 | WW1075 | TS1075xWW1075 | TM1075-80xWW1075 | TM1075-120xWW1075 |
| P1076 | TS1076 | WW1076 | TS1076xWW1076 | TM1076-80xWW1076 | TM1076-120xWW1076 |
| P1077 | TS1077 | WW1077 | TS1077xWW1077 | TM1077-80xWW1077 | TM1077-120xWW1077 |
| P1078 | TS1078 | WW1078 | TS1078xWW1078 | TM1078-80xWW1078 | TM1078-120xWW1078 |
| P1079 | TS1079 | WW1079 | TS1079xWW1079 | TM1079-80xWW1079 | TM1079-120xWW1079 |
| P1080 | TS1080 | WW1080 | TS1080xWW1080 | TM1080-80xWW1080 | TM1080-120xWW1080 |
| | | | TOTAL | TOTAL 80% | TOTAL 120% |

Fig. 9

| P | WW | WR |
|---|---|---|
| P1 | WW1 | |
| P2 | WW2 | |
| P3 | WW3 | |
| P4 | WW4 | |
| P5 | WW5 | |
| P6 | WW6 | |
| ... | ... | |
| P120 | WW120 | WR120 |
| P121 | WW121 | WR121 |
| P122 | WW122 | WR122 |
| P123 | WW123 | WR123 |
| P124 | WW124 | WR124 |
| P125 | WW125 | WR125 |
| P126 | WW126 | WR126 |
| ... | ... | ... |
| P196 | WW196 | WR196 |
| P197 | WW197 | WR197 |
| P198 | WW198 | WR198 |
| P199 | WW199 | WR199 |
| P200 | WW200 | WR200 |
| ... | ... | ... |
| P480 | WW480 | WR480 |
| P481 | WW481 | WR481 |
| P482 | WW482 | WR482 |
| P483 | WW483 | WR483 |
| P484 | WW484 | WR484 |
| P485 | WW485 | WR485 |
| P486 | WW486 | WR486 |
| ... | ... | ... |
| P556 | WW556 | WR556 |
| P557 | WW557 | WR557 |
| P558 | WW558 | WR558 |
| P559 | WW559 | WR559 |
| P560 | WW560 | WR560 |
| ... | ... | ... |
| P1074 | WW1074 | |
| P1075 | WW1075 | |
| P1076 | WW1076 | |
| P1077 | WW1077 | |
| P1078 | WW1078 | |
| P1079 | WW1079 | |
| P1080 | WW1080 | |

METHOD AND A DRIVE MEANS TO DRIVE A MACHINE

This application is a continuation of Ser. No. 09/554,757 filed May 19, 2000, now U.S. Pat. No. 6,525,496.

BACKGROUND OF THE INVENTION

The invention relates to a method to drive a machine having at least one component carrying out a periodic motion and an electric drive motor, and to a drive means for such a machine.

In the present invention, the expression "machine containing at least one component carrying out a periodic motion" connotes that this component does not carry out a continuous, constant and illustratively rotary motion. For instance a weaving machine comprises several such components carrying out periodic motions. Such a component for instance is the batten which is pivoted to-and-fro at given times. The shed forming means are another such component which is moved up and down at specific times. Gripper weaving machines include grippers and their drive elements as components that reciprocate at given times. Where several components carrying out periodic motions are present, a resultant composite period will be present. As regards to weaving machines, this period is determined by the number of weaving cycles in a weaving pattern. The interlacing of filling and warp threads repeats accordingly in a repeat pattern.

If now such a machine, for instance a weaving machine, is driven by an electric asynchronous motor fed from a power line, then this motor will be severely loaded. As a result it will operate at lower efficiency. This lower efficiency is explained foremost by the angular speed of the drive shaft of such a weaving machine and hence the strongly varying angular speed of the drive motor. Relative to nominal angular speed, the higher and/or lower actual angular speed causes the drive motor to draw large currents. These large currents entail high energy losses due to the drive motor's heat dissipation and only ineffectively contribute to that torque generated by the motor which is required to keep the weaving machine's angular speed constant.

It is known to mount a flywheel on such a weaving machine in order to reduce such drawbacks. This flywheel substantially improves the efficiency of an asynchronous motor operating as the drive motor. However large torques are exchanged between the flywheel and the weaving machine, the latter being much stressed as a result and undergoing wear thereby. Not only high torques, but also large torque differentials, furthermore, are disadvantageous.

When the flywheel is linked by a clutch to the weaving machine, the flywheel's kinetic energy is available to rapidly start this weaving machine. However this design entails the drawback that the link means must absorb large torques. Another drawback is that after starting, the weaving machine reaches fairly quickly an angular speed which is only a percentage of the working angular speed, for instance 80%. However, on account of the flywheel's moment of inertia, thereafter the working angular speed is reached relatively late. Furthermore the percentage of the working angular speed depends on ambient factors, for instance the temperature of the weaving machine, the amplitude of the line voltage, the humidity in the weaving room, the shutdown time of this weaving machine etc. This condition is especially disadvantageous in weaving machines because of the degradation in quality of the woven fabric.

It is further known in the weaving machine art to increase the angular speed of the flywheel in relation to the working angular speed before starting the weaving machine in order to then rapidly reach a higher percentage of the working angular speed. However the angular speed that is attained remains dependent on the above cited ambient factors and again there is loss of quality of the woven fabric.

SUMMARY OF THE INVENTION

The objective of the invention is to create a drive means for the machine of the initially cited kind and to make this drive means efficient, such that it will incur only minor energy losses.

This problem is solved in that the drive motor is controlled in such a way that the torque applied by the drive motor to the machine will be predetermined.

By controlling the applied torque, the drive motor need not operate at higher force or power against the machine's moment of inertia, that is, it will not act as a brake when the moment of inertia acts as a bias towards increasing the machine's speed, nor shall it react by an increased torque when the moment of inertial tends to reduce the speed. Accordingly the drive motor is controlled in such manner that it follows the machine's angular speed resulting from this machine's moment of inertia. When the machine's moment of inertia leads to a drop in speed, the drive motor goes along, just as it goes along when the moment of inertia leads to an increase in the speed of the machine. While the speed fluctuations of the machine are somewhat increased thereby, this aspect of the invention as a rule shall not operationally interfere. Especially in weaving machines, larger speed fluctuations will not interfere over one period or over one weaving cycle.

The invention offers the advantage that the torque applied by the drive motor can be preset and is selected in such manner that the energy losses in the drive motor shall be limited and furthermore, the loading and/or the loading differential in the machine's drive shaft and/or in the motor's shaft is also reduced. The drive-motor torque preferably is predetermined in such a way that this drive motor always can transfer energy to the machine. As a result, a drive motor capable of high power over a long time need not be used, instead one may use a comparatively economical small drive motor which moreover operates at advantageous efficiency. It is assumed in this respect that the drive motor need not be unduly loaded to attain an approximately constant angular machine speed. A variation in machine angular speed is allowable and there is no need for the drive motor to provide high power at given times in order to maintain a constant angular speed. The attempt to keep the angular speed constant leads to the drawback that it requires a costly, high-power drive motor in order to apply transient high power. Such high power would be much larger than the average power required of the drive motor and this imbalance would be manifested in energy losses, i.e. heat dissipation, and hence resulting in unsatisfactory drive-motor efficiency.

In another design of the invention, drive-motor control data are retrievably stored to operate the drive motor at any angular speed by means of a plurality of different torques in such manner that the angular position of the drive motor is detected and in that the value of the torque in the memory corresponding to the detected speed is set as the torque to be applied. One simple solution is that the applied torque shall be constant.

In another design of the invention, the torque to be applied by the drive motor is stored as a function of this drive motor's angular position, the instantaneous angular position of the drive motor is detected and the torque value relating to the instantaneous angular position is read in the memory and is then predetermined as the torque to be applied. In this manner the function of the applied torque is matched to the moment-of-inertia function.

Especially with regard to weaving machines, the torques to be applied shall be advantageously stored in relation to the drive motor's angular positions. In this case the function of that moment of inertia can be selected for which the weaving machine shall weave optimally for a given material.

In another design of the invention, the angular-speed function of the drive motor of which the torque is being controlled is measured and stored in relation to the drive motor's angular positions and the machine is started by a start circuit by means of which the drive motor is regulated by an angular speed control at an angular speed which is stored in relation to the instantaneous angular position of the drive motor. This configuration offers the advantage that the drive motor can be started in such a way that the machine runs at an angular speed function already a short time after starting which already corresponds to the speed function that the machine would obey if it had not been stopped. As a result the machine operates already shortly after starting at good efficiency. Because controlling the speed of the drive motor causes torques which substantially are equal to the angular speeds the motor would be running at if the torques were controlled, the drive motor again operates efficiently. This starting circuit is especially advantageous for a weaving machine. Because in practice the speed function shortly after starting corresponds to that in effect before the weaving machine was stopped, this weaving machine practically will be operated at a speed the same as before the stoppage at the beatup of the first inserted filling. This feature is independent of ambient effects. In this manner the fillings can be woven the same way after the start of the weaving machine as before stopping it. Consequently the quality-degrading starting marks in the fabric can be substantially avoided. Moreover this latter advantage also is enjoyed when there are changes in weaving-machine temperature or other ambient effects at the time of starting relative to the previous temperatures and ambient effects.

In a further embodiment of the invention, the machine is shut off by a shutdown circuit decelerating the drive motor to angular speeds associated to predetermined angular position, the drive motor coming to rest in a predetermined angular position. The latter feature is especially advantageous in weaving machines, particularly when a filling rupture or the like must be remedied.

Further features and advantage of the invention are discussed in the following description of the embodiments shown in the drawings.

BRIEF DESCRIPTION OF THE DRAWINGS

FIG. 2 is a table of stored values of drive-motor speeds and of values of drive-motor applied torques with associated values of amplitude and frequency of the line power, FIG. 3 is a table of values of the drive-motor angular positions and of values of the torques which are to be applied at those angular positions, FIG. 4 is a table of values of the drive-motor's angular positions and of several columns listing the torque functions and/or constant values of the torques to be applied at those angular positions, FIG. 5 is a table of values of the drive-motor's angular positions and of values of the associated angular speed, FIG. 6 is a table of drive-motor angular positions and of several columns of mutually proportional values of the drive-motor's torques, FIG. 7 is a table of values of the drive-motor's angular positions and of associated values of angular speeds and values of starting speeds, FIG. 8 is a table of values of the drive-motor's angular positions and of values of the torque which must be applied by the drive motor when starting, of the corresponding angular speeds and of the products of values as well as of the sums of these products, FIG. 9 is a table of drive-motor angular-position values, of values of the associated angular speeds and of stopping angular-speed values

DETAILED DESCRIPTION OF THE PREFERRED EMBODIMENTS

Figure 1:
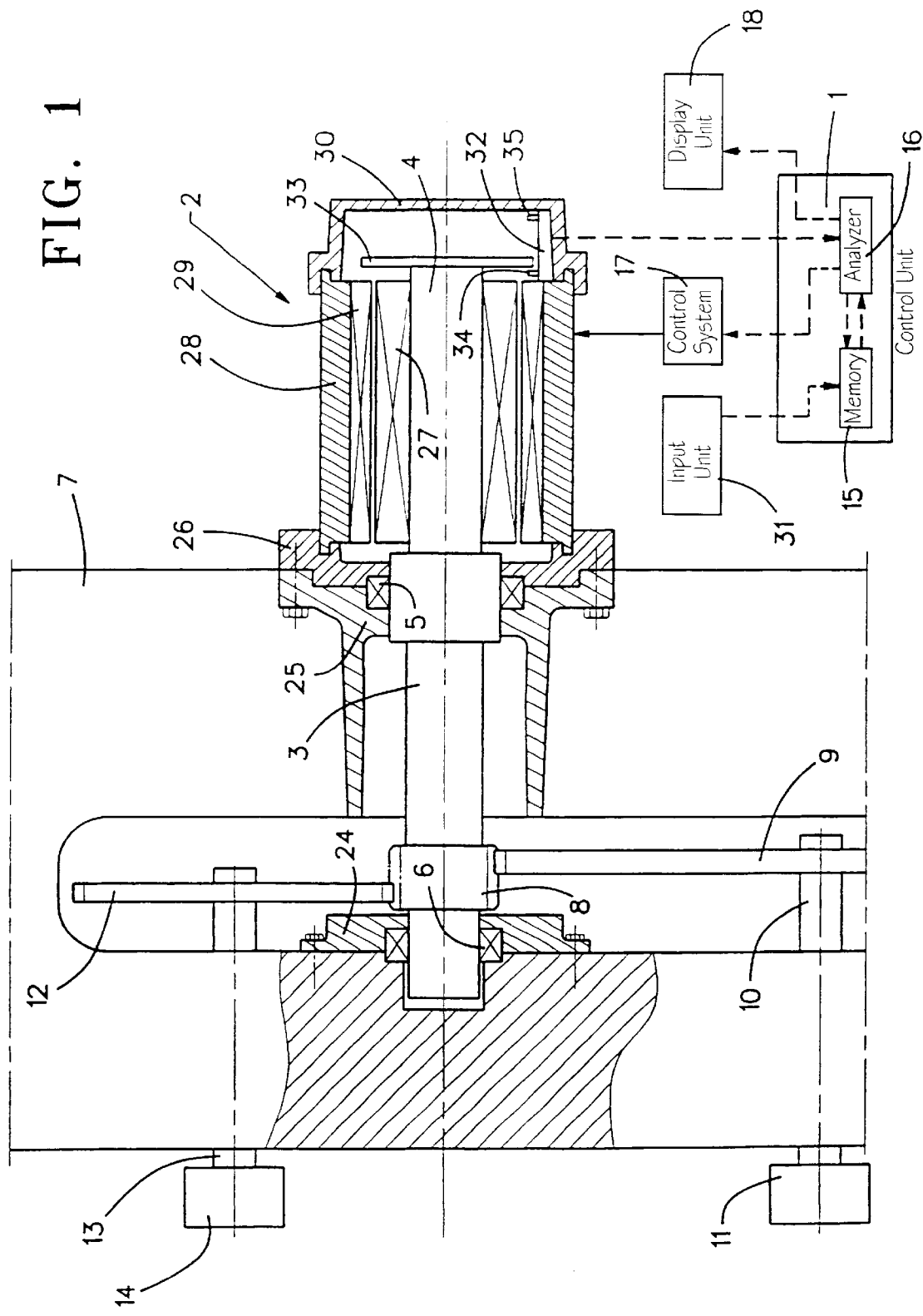
FIG. 1 is a schematic of a weaving machine's drive system controlled in the manner of the invention.

The weaving machine drive system shown in FIG. 1 contains a drive motor 2 controlled by a control unit 1 and driving the weaving machine's main drive shaft 3. In this embodiment, the motor shaft 4 and the main drive shaft 3 are integral. The main drive shaft 3 is supported by bearings 5, 6 in a weaving machine frame 7.

A switching gear 8 is irrotationally affixed to the main drive shaft 3. The switching gear 8 meshes with a drive gear 9 irrotationally connected to a drive shaft 10 that drives the first drive elements 11, for instance shed-driving elements. The switching gear 8 may mesh with a drive gear 12 irrotationally mounted on a drive shaft 13 for second drive elements 14 which illustratively drive the batten and the grippers of the gripper weaving machines. The main drive shaft 3 and the drive shafts 10, 13 run parallel to each other. During a weaving procedure, the main drive shaft 3 by means of the switching gear 8 drives both gears 9 and 12 and the drive elements 11, 14 connected to the latter.

To limit the drive torque applied to the main drive shaft 3, the diameter of the switching gear 8 is selected to be smaller than the diameter of the drive gears 9, 12. The drive gear 12 for the drive element 14 rotates once per filling insertion. The drive gear 9 for the drive elements 11 during the same time period rotates, for instance, only by half a revolution because the shed-forming means need only complete half a cycle for one filling insertion. For that purpose the diameter of the drive gear 9 is twice the diameter of the drive gear 12.

The bearing 6 is mounted between the weaving machine frame 7 and a flange 24 which is screw-fastened to the frame 7. The bearing 5 is situated between a flange 25 which is part of the weaving machine frame 7, and a flange 26 which is screw-fastened to the frame 7. The rotor 27 of the drive motor 2 is irrotationally affixed to the motor shaft 4 which—as already discussed—is integral with the main drive shaft 3. The stator 29 of the drive motor 2 is mounted in a housing 28 and affixed by the flange 26 to the weaving machine frame 7. For that purpose the housing 28 is fitted with a thread meshing a thread of the flange 26. The flange 26 centers the stator 29 relative to the rotor 27. The stator 29 encloses the rotor 27. The housing 28 includes a second threaded end onto which is screwed a threaded flange 30, sealing in dust-tight manner the end face of the drive motor 2.

The control unit 1 includes at least one memory 15 and an analyzer 16. An input unit 31, a display unit 18 and a sensor 32 are connected to the control unit 1. The sensor 32 cooperates with an encoding disk 33 mounted on the motor shaft 4. In one embodiment the encoding disk 33 and the sensor 32 are mounted on the weaving machine's main drive shaft 3. The control unit 1 can determine the angular position and the angular speed of the motor shaft 4 by means of the signals transmitted by the sensor 32. Illustratively the sensor 32 contains a light source 34 and an oppositely situated light detector 35, the encoding disk 33 being mounted between the source and detector. The encoding disk 33 is fitted with teeth or apertures or the like which determine whether light beams from the light source 34 can reach the detector 35. Obviously a different sensor 32 also may be used, for instance one operating on magnetic, electromagnetic or other arbitrary principles.

The power output of the drive motor 2 is controlled by a control system 17 of the control unit 1. In a preferred embodiment, the drive motor 2 is a switch-controlled reluctance motor. Such a drive motor 2 is especially appropriately controlled in operation in the manner of the present invention when running, starting, and shutting down. Illustratively the control system 17 is an electronically regulated power source or power stage which is able to apply a current of preselected amplitude and preselected frequency.

In order to control the drive motor 2, first drive-motor control data are stored in the memory 15 of the control unit 1. These control data are fed manually or electronically through the input unit 31 into the control unit 1. Illustratively the control data are the amplitude A and the frequency F of the current applied to the drive motor 2.

Illustratively the control data are detected by known measuring instruments. For each angular speed of the drive motor which is within the operational range of angular speeds of the particular machine, a plurality of torques which may be applied by the motor are involved and the associated applied currents are determined. As illustratively shown by the table of FIG. 2, the drive-motor's angular speed W is sub-divided into a hundred angular-speeds W1 through W100 which overlap the operational range of the drive motor 2. There is the possibility for each of these angular speeds W1 through W100 to generate one hundred different torques, namely torques T1 through T100 which are spread across the operational range of the drive motor 2. For each of these angular speeds W1 through W100 and each of the associated torques T1 through T100, the amplitudes A and the frequencies F are then ascertained, that is there will be ascertained 10,000 values of amplitudes A1 through A10,000 and 10,000 values of frequency F1 through F10,000, which all shall be stored appropriately.

Obviously, all control data can be stored as values of applied voltage and frequency. In this instance the control system is in the form of an electronically controlled voltage source which provides a voltage of selectable amplitude and of selectable frequency regardless of load.

By means of the stored data shown in FIG. 2, the drive motor 2 can be operated in such a way that it shall always apply a constant torque to the machine. This desired constant torque is fed by the input unit 31 to the control unit 1. By means of signals from the sensor 32, the analyzer 16 of the control unit 1 determines the actual angular speed of the drive motor 2 and also feeds them into the control unit 1. The encoding disk 33 is fitted with teeth or apertures configured at a known angular spacing. The angular speed of the motor shaft 4 can be computed by measuring the time internal between two consecutive light beams transmitted from the emitter 34 to the detector 35. Furthermore, the instantaneous angular position P of the drive motor can be detected by means of the sensor 32 for instance by counting the number of signals transmitted by the sensor 2 relative to a known reference position.

The analyzer 16 retrieves those control data relating to the first measured angular speed by means of which the desired constant torque at such angular speeds can be generated and it transmits those control data to the control system 17. Illustratively the input at the input unit 31 is to the effect that the torque applied by the drive motor 2 shall have the constant value T 50. If for instance when the actual angular speed W 6 is measured, then the line in FIG. 2 containing W 6 and T 50 also indicates the relevant control data. In this illustration these are the control data A 4906 for current level and F 4906 for frequency. Then the drive motor 2 is powered by these control data A 4906 and F 4906 and applies the torque T 50 at that instantaneous angular speed of W 6.

In regard to a machine, for instance a weaving machine, having components carrying out periodic motions, the moment of inertia varies in such a way that at one time the machine runs faster and at another time runs slower again. The above described control makes it possible to keep constant the torque applied to the machine by the drive motor 2 even when the instantaneous speeds of the motor are changing. The control of the invention succeeds in matching the control data for the drive motor 2 to the intrinsically changing machine speeds while not counteracting them, that is, the drive motor neither attempts to decelerate the machine nor to accelerate it. Accordingly the drive motor 2 does NOT act to reduce the machine's speed fluctuations and as a result this machine will indeed operate at somewhat larger speed fluctuations, namely in reaction to the inherent evolution of the moment of inertia.

In another design, to determine the torque applied by the drive motor 2 to the machine, the periodic function of the torques relating to the angular position P of the drive motor 2 is stored and is made available in relation to this angular position. The function of the torque TT to be applied in relation to the angular position P is stored for instance in the manner shown in FIG. 3. It is assumed in this embodiment that the weaving pattern is a so-called twill weave wherein the weaving pattern repeats after three weaving cycles, that is following three times 360° (a total of 1,080°) by the main drive shaft. The angular positions succeeding one another at 1° intervals correspond each to the desired torque TT which is stored in the memory 15 of the control unit, namely, the torques to be applied TT1 through TT1080 for the angular positions P 1 through P 1080.

In this embodiment the instantaneous angular position of the drive motor 2 is detected by the sensor 32. The torque value TT to be applied relating to the instantaneous angular position is then retrieved. If for instance the instantaneous angular position is P 400, then the torque to be applied will be TT 400. The control data relating to the torque to be applied TT 400 are determined from the table of FIG. 2. The instantaneous angular speed of the drive motor 2 is detected. Also that value T of table 2 is checked which corresponds to the value TT 400 of applied torque required for the applied-torque position P 400. One may assume for instance that the instantaneous angular-speed value is W6 and the value TT 400 equals the torque T 50. In this instance the control data for the amplitude will be again A 4906 for the amplitude and again F 4906 for the frequency. The procedure is the same for any other stored angular position P. Illustratively a torque TT 1070 to be applied and corresponding to the torque T 100 is stored for the angular position P 1070. If W 5 is detected as the instantaneous angular speed at the angular position P 1070, then the drive motor 2 will be controlled by means of the control data associated to the row W5 and T100, that is, by means of the control data A 9905 for the amplitude and F 9905 for the frequency.

The applied-torque function illustratively may be the sum of a constant value and of several sine functions, and in regard to a weaving machine, that period at which the procedure repeats itself corresponds to the period of the weaving pattern. Depending on the number of weaving cycles in one period and depending on the selected size of the steps between angular positions, a number of values for the torque to be applied may be stored. If for instance one period comprises 10 weaving cycles and if for every 5° in angular position another value must be set for the applied torque TT, then the table (similarly to FIG. 3) includes, for instance, two columns each with 720 values.

In regard to a weaving machine, advantageously, several periodic functions of the angular positions of the drive motor 2 for the torques to be applied by the motor and/or also several constant values of the torques will be stored in the memory 15 of the control unit 1. An example is given by the table of FIG. 4. It lists several functions TA through TD, for the torque to be applied, each with values TA1 through T 1080, TB 1 through TB 1080, TC 1 through TC 1080 and TD 1 through TD 1080 and several constant values TE through TG of the torque to be applied. One of these periodic functions TA through TD and/or the constant values TE through TG driving the drive motor 2 can be selected at the input unit 31. In this manner an appropriate torque can be selected for every fabric to be woven, being of a constant value or being subject to a selectable function.

Appropriate functions of the torques to be applied can be determined empirically. Thereafter and again empirically, the best function at the given weaving parameters for best weaving quality also may be determined. Keeping in mind that in this respect, presetting a constant value of the torque to be applied may also be considered presetting a function, in one form of a constant value.

As already mentioned above, the instantaneous angular speed of the drive motor will be measured. As shown in FIG. 5, this instantaneous angular speed WW is also stored in relation to the angular position P of the drive motor 2 in the control unit's memory 15. The instantaneous angular speed WW also changes within a period which corresponds to the weaving pattern to be made. Table 5 lists angular positions P 1 through 1080 per degree and the corresponding instantaneous angular speeds WW 1 through WW 1080 are stored in memory.

The stored angular-speed function may be advantageously used for instance to predetermine an average operational machine rate, that is, an average angular speed of the drive motor 2. The average angular speed of the drive motor 2 illustratively is determined by forming the average of the stored function of the instantaneous angular speeds WW (FIG. 5). This average is also stored. When the particular detected instantaneous value of the average angular speed is too high or too low, the torque to be applied by the machine's drive motor 2 will be correspondingly changed.

In one possible implementation—for instance when the average angular speed is 10% too low or too high—the torque value to be applied and stored in the memory 15 of the control unit will be commensurately raised or lowered by the processing unit 16 or analyzer. If thereafter the average angular speed still is too low or too high, the adjustment of this average angular speed can be repeated in such manner until the instantaneous value of the average angular speed coincides with the desired value.

In another design, several columns listing the torque to be applied are stored in the memory 15 of the control unit 1 and are listed in given ratios. As illustratively shown in FIG. 6, one column contains the torque TM 100% corresponding to the normal function of the torque to be applied. For instance TM 100% may correspond to the values of the torque function TB of FIG. 4. The column TM 80% contains those values which are 80% of TM 100%. Correspondingly, the column TM 120% contains those values which are 120% of the values of TM 100%. In similar manner further columns are used with values between TM 80% and TM 120%. When the machine is operated in controlled manner at the values TM 100% for the torque to be applied and if it is then observed that the average angular speed is 10% too low or too high, the control unit will select the values TM 110% or TM 90%. This procedure also may be repeated several times until the instantaneous value of the average angular speed coincides with the value selected for the average angular speed. In this manner the weaving machine can be operated regardless of ambient effects (for instance temperature) at a desired angular speed.

It is understood that the functions TM 80% through TM 120% may also be generated for TA, TC through TG of FIG. 4. Such functions need not always differ by a full percentage point. Illustratively they may differ by fractions of a percent. Obviously as well, the functions may differ by other percentages.

The ascertained function of the angular speed of the drive motor 2 as determined by the control of the torque applied to the machine and which also is periodic furthermore is also used at startup or when starting the machine. This angular-speed function of the angular position of the drive motor is shown in FIG. 5 and is stored in the memory 15 of the control unit 1. While the drive motor 2 is in startup, the instantaneous angular position of this motor will be determined, that is, both the starting position as the angular positions of the drive motor 2 shortly after the time of starting. Also, in the startup of the drive motor 2, the instantaneous angular speeds will be determined for each angular position of this motor. When being started, the drive motor 2 is controlled by control data selected in such a way that it runs during that time at angular speeds coinciding with the periodic function of the WW angular speeds shown in FIG. 5.

The procedure may be as follows: if the instantaneous angular speed is less than the stored angular-speed value for that angular position, the control data are so matched as determined by the differentials that the instantaneous value of the angular speed will be as close as possible to the value of the angular speed stored in relation to the instantaneous position, or until such differentials become zero. Such a procedure can be implemented for instance by raising the values of the control data for the amplitude of the supply current as a function of the ascertained differential. If the instantaneous angular-speed value is larger, then illustratively the supply current shall be commensurately decreased. In principle this is a known regulation with feedback of a drive motor's angular speed. The control data of the drive motor 2 are selected in such a way that shortly after starting, the instantaneous angular speed of said drive motor shall coincide with the stored and predetermined angular-speed values for the drive motor 2.

Because the instantaneous angular speed of the drive motor 2 directly after starting is lower than the stored angular-speed value, the motor is highly loaded for a short time after starting. After this short time, however, the drive motor 2 runs at a speed substantially corresponding to the value of the stored angular-speed function. This feature offers a great advantage in that the speed-controlled drive motor also applies a torque which substantially will correspond to the torque function and/or to the constant torque at which the drive motor had been controlled before shutdown. In regard to weaving machines, this feature is not only advantageous in operating the drive motor 2 at good efficiency but also—immediately after starting—a fabric can be manufactured in the same manner as if the weaving machine had not been stopped.

The procedure may be modified in order to reduce the stress, directly after starting, on the drive motor 2 and the control system 17. First a start operation is determined for the drive motor 2. In regard to a weaving machine, such a start procedure is set for each weaving cycle because a weaving machine can be stopped in such cycle and correspondingly will have to be restarted. In the embodiment under discussion, where a weaving pattern involves three weaving cycles, three start procedures are set. A first start procedure which is part of starting the weaving machine in the first weaving cycle, is shown in the table of FIG. 7. It contains the values WS 200 through WS 280 of the angular speed of the drive motor 2 which are associated with the angular positions P 200 through P 280. For the sake of clarity, the values of function of the angular speed WW of FIG. 5 are repeated also in FIG. 7. The value WS 200 of the start procedure for the angular speed need not be zero, illustratively its value may be between zero and the value WW 200 of the table of FIG. 7. The start procedure values WS are approximately that of the angular speed WW, the value of WS 280 being practically the same as the value of WW 280.

Accordingly the drive motor 2 is controlled in such a way that following its start it will reach the angular speeds WS 200 through WS 280 in the angular position between P 200 and P 280. From the angular position P 281, the drive motor 2 then will be controlled according to the stored values of angular speeds WW 281 etc.

Because a weaving machine may be stopped in each weaving cycle of a weaving pattern and be correspondingly restarted, there will be as many start procedures as there are different cycles in the weaving pattern. For that reason the table of FIG. 7 furthermore shows a second start procedure between the angular positions P 560 and P 640, the second start procedure being associated with the second weaving cycle. Correspondingly there may be a further start procedure between the angular positions P 940 and P 1020. After it has reached the angular positions P 280, P 640 and P 1020, where in each case a start procedure ends, the drive motor 2 is controlled according to the stored function of the angular speed WW, that is, from the angular positions P 281, P 641 and P 1021 which are shown in FIGS. 5 and 7.

Obviously the difference of the angular positions between the beginning positions and the end positions of the start procedures of consecutive weaving cycles need not always be 360°. Again the difference between the beginning angular position and the end angular position of a start procedure need not be 80°.

The machine starting procedure allows a quick start, namely a start with an angular-speed function which already in a very short time will correspond to that angular speed function which shall also be attained when the drive motor is controlled according to a torque to be applied. This angular-speed function is shown in FIGS. 5 and 7. Thereafter the control is switched from control by angular-speed function to control by the torque to be applied by the drive motor 2. In order that there be smooth transition, the following procedure may be employed.

The instantaneous torque values TS are detected in the manner of the table of FIG. 2 in each drive-motor angular position and then stored when the motor is controlled by an angular-speed function. The instantaneous values TS 1 through TS 1080 are stored in a memory 15 of the control unit 1 for the angular positions P 1 through P 1080 (FIG. 8). The particular control data used to operate the drive motor obviously are also known.

Preferably the switching from the angular-speed control of the drive motor to its control by the torque it will apply can be carried out in such manner that the average angular speed of the drive motor 2 will practically remain constant. For that purpose and in illustrative manner the tables of FIG. 6 and FIG. 8 can be used. The table of FIG. 8 contains the instantaneous values of the angular speed WW of FIG. 5 for the angular positions P 1 through P 1080. Thereupon, for each angular position, the product of the instantaneous values TS of the torque and the instantaneous values of the angular speed will be formed and be listed in a column. From these results, the sum of this column is calculated as its TOTAL. This sum is a measure of the energy fed to the machine. Moreover, the products of the instantaneous angular-speed values WW and of the torque values T 80% through T 120% (table of FIG. 6) are formed and listed in columns of the table of FIG. 8. The sum of each such a column is then formed, and the sums of TOTAL 80% through TOTAL 120% are compared with the overall sum TOTAL. That column of which the sum TOTAL equals the overall sum TOTAL, for instance the column TM 102%, makes it possible, by controlling according to the TM 102% torque function, to feed as much energy to the machine as does the drive motor 2—when being controlled by the angular-speed function WW (table of FIG. 5)—and when the motor delivers the torque TS. When switching from one kind of control to the other, the drive motor 2 therefore will be operated approximately at the same average angular speed. In another solution of the invention, that column listing the function of the torque TM 80% through TM 120% is selected which comprises the same average torque as does this column listing the instantaneous torque value TS. The latter procedure is less accurate, however, the instantaneous torque TS deviating only slightly from that torque by means of which the drive motor 2 was controlled before stopping, the average angular speed will be affected only by a little. It is possible furthermore—when the instantaneous value of the average angular speed deviates somewhat from the desired value of the average angular speed—to select an appropriate torque between TM 80% and TM 120% to control the drive motor 2 in the manner elucidated in relation to FIG. 6.

When stopping or shutting off the machine, the control is switched to a stop procedure. In regard to a weaving machine, a corresponding stop procedure is determined for each weaving cycle. In regard to the shown embodiment, a stop procedure is determined for the drive motor 2 such that it comprises the preset angular-speed values WR each associated to angular positions. Illustratively, angular-speed values WR 120 through WR 200 are provided which are associated with the angular positions P 120 through P 200. These WR values, which are also provided for the other weaving cycles, are listed in the table of FIG. 9 next to the instantaneous angular-speed values WW of the table of FIG.

5 for the pertinent angular positions P. The angular-speed value WR ends in zero when the drive motor is in an angular position P 200 at which the motor 2 must be shut down. It must be noted in this respect that the angular position P 200 is also that angular position at which the drive motor 2—for instance corresponding to FIG. 7—will be started. When stopping the drive motor 2, the instantaneous angular positions P of the drive motor are determined. The drive motor 8 is controlled by means of the control data (current's amplitude and frequency) that for each angular position the associated angular speed WR shall be obtained according to the stopping procedure. This implementation can take place similarly to the start procedure in that the amplitude and frequency of the supply current are adjusted in relation to the difference between the instantaneous angular-speed value and the desired angular speed of the stop procedure in such a way that the drive motor 2 decelerates the machine in the desired manner.

In an embodiment of the invention, WR values for the drive-motor angular speed are preset for the stop procedure in relation to the motor's angular position P, the values WR being appended to those WW values of this drive motor's angular-speeds as listed in tables of FIG. 5 or 9. The value WR 120 of the stop procedure in this implementation is equal to the angular-speed value WR 120 when the drive motor 2 is controlled by a function of the torque and/or by a constant torque. The WR values are reduced to zero at the angular-speed value WR 200 because the drive motor 2 is to be shut down at the angular position P 200.

Because a weaving machine can be stopped within any weaving cycle, as many stop procedure are provided as there are weaving cycles in the weaving pattern. The table of FIG. 9 shows stop procedures between the angular positions P 120 and P 200, P 480 and P 560 and also between P 840 and P 920. Obviously the particular differential between the angular positions at the beginning of the stop procedure and at its end need not always be 360°. Accordingly the difference between beginning and end of the stop procedure need not be 80°.

Figure 10:
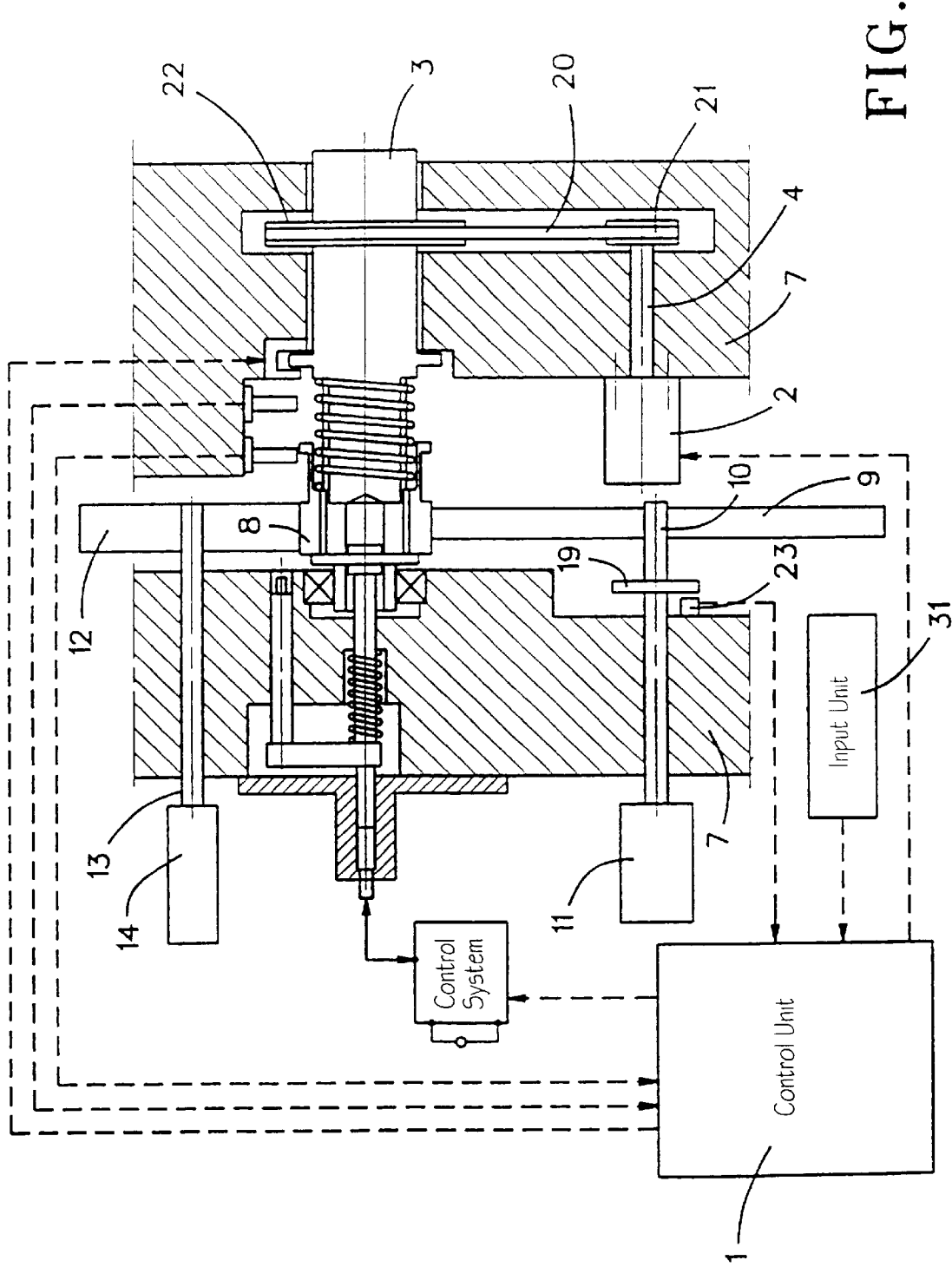
FIG. 10 is a schematic of a drive system for a control system of the invention.

The control means of the invention may be employed in an arbitrary machine comprising one or more components carrying out a periodic motion whereby the moment of inertia entails periodically changing machine speeds. FIG. 10 shows an embodiment wherein the drive motor 2 drives a weaving machine by means of a drive belt consisting of belt 20 and pulleys 21, 22. This embodiment illustratively is identical with that disclosed in U.S. Pat. No. 5,617,901. The drive shaft 4 of the drive motor 2 and the weaving machine's main drive shaft 3 are not integral. The angular speed and/or the angular position of the drive motor 2 are detected, not directly at this drive motor, instead at a drive shaft 10 of the driven weaving machine, the shaft 10 being coupled to the drive shaft 4 of the drive motor 2. An encoding disk 19 irrotationally connected to the drive shaft 10 is used and illustratively corresponds to the encoding disk 33 of FIG. 1 and cooperates with a sensor 23 connected to a control unit 1. Illustratively the sensor 23 corresponds to the sensor 32 of FIG. 1. In order to derive the angular speed and/or the angular position of the drive motor 2 from the signals transmitted by the sensor 23, the transmission ratio of motor shaft 4 to the drive shaft 10 must be taken into account.

The values of angular position and/or of the angular speed of the drive motor 2 that are listed in the tables of FIGS. 2 through 9 need not mandatorily be the absolute values of position and/or angular speed. Instead values proportional to the absolute ones may also be used. Such is the preferred case for instance when the sensor 23 is mounted on the drive shaft 10 of the machine to be driven, the shaft 10 being driven at a given transmission ratio by the motor shaft 4. In such a case the tables of FIGS. 2 through 9 may contain values which are proportional to the absolute values, the proportionality factor depending on the transmission ratio. It is an easy manner for the analyzer 16 to take into account this transmission ratio so that the drive motor 2 will be correspondingly controlled during normal operation and/or be started and/or be stopped.

Controlling the drive motor 2 in relation to a predetermined torque is advantageous for improving efficiency. The torque applied by the drive motor 2 is not measured by sensors but is controlled by the control unit 1. If the driven machine malfunctions, for instance if the gear 9 detaches off the drive shaft 10 and the drive elements 11 no longer are being driven, as a consequence the drive motor will be under less load and then shall attain a very high angular speed. To preclude such an eventuality, means are included in the control unit's analyzer 16 to interrupt the control of the drive motor 2 or stop it when excessively high angular speed is being detected. It may happen as well, that the average angular speed changes abruptly and substantially. Illustratively such an event may take place if one of the driven machine's bearings 5, 6 freezes. In this case the machine should be switched off. Obviously, further safety steps may be adopted. For instance, if the input unit 31 were to be fed an excessively high value for the torque to be applied, the analyzer 16 might transmit an error message to the display 18.

The control system 17 is not necessary separate from the control unit 1. The system also may be a part of the control system 1 per se. In another embodiment, however, the memory 15, analyzer units 16 and the control system 17 also may be separate devices.

Furthermore the control means of the invention may also be used when a switched clutch is present between the drive motor 2 and the driven machine. In this case however, the drive motor's absolute angular position may not be selected as the measured value. Instead a relative angular position depending on the angular position of the driven machine's drive shaft must be determined. If for instance a clutch is mounted in the embodiment of FIG. 1 between the machine's main drive shaft 3 and the motor shaft 4 to couple to each other the motor shaft 4 and the drive shaft 3 in various angular positions, then the sensor 32 together with the encoding disk 33 can be mounted on the driven machine's drive shaft 3.

The method and control means of the invention obviously are not limited to the above described illustrative implementations. Very different modes of implementation can be realized within the scope of the patent claims.

What is claimed is:

1. A method of driving a machine having an electrical drive motor for supplying torque of predetermined value and having at least one component, which carries out a periodic motion, comprising the steps of:

acquiring first sets of control data for the drive motor, each of said first sets of control data being arranged to drive the motor at each of a plurality of angular speeds at a first defined torque;

acquiring second sets of control data for the drive motor, each of said second sets of control data being arranged to drive the motor at each of a plurality of angular speeds at a second defined torque;

acquiring at least third and fourth sets of control data for the drive motor, each of said at least third and fourth sets of control data being arranged to drive the motor at each of a plurality of angular speeds at least at respective third and fourth defined torques;

measuring an instantaneous angular speed of the drive motor;

retrieving one of said sets of control data which is arranged to drive the motor at the measured angular speed with a required torque and applying said retrieved set of control data to the motor.

2. The method as claimed in claim 1, wherein the torque to be applied by the drive motor is a constant predetermined value.

3. The method as claimed in claim 1, wherein the torque to be applied by the drive motor is stored as a function of angular positions of the drive motor, and further comprising the steps of detecting instantaneous angular positions of the drive motor and relating said instantaneous angular positions to said required torque.

4. The method as claimed in claim 1, wherein a plurality of torques to be applied by the drive motor are stored in a memory as (i) functions relating to angular positions of the drive motor, (ii) constant values, or (iii) constant values and functions relating to angular positions of the drive motor.

5. The method as claimed in claim 1, wherein the angular speeds are stored in relation to angular positions of the drive motor.

6. The method as claimed in claim 5, wherein the machine is started by a start circuit which, by means of angular-speed regulation, is set at angular speeds which were stored in relation to particular instantaneous angular positions of the drive motor.

7. The method as claimed in claim 6, further comprising the step of switching from control by the angular speed of the drive motor to control by the torque to be applied by the drive motor in such a manner that an average angular speed remains at least approximately constant.

8. The method as claimed in claim 1, further comprising the steps of deriving an instantaneous average measured speed from the measured instantaneous measured speed; comparing the instantaneous average angular speed with a predetermined value; and, in case of deviation, raising or lowering the instantaneous average speed to reach said measured value.

9. The method as claimed in claim 1, further comprising the step of switching the machine off by a switchoff circuit, wherein the drive motor is decelerated down to angular speeds which are associated with predetermined angular positions and the drive motor is made to stop at a predetermined angular position.

10. Apparatus for driving a machine including a drive motor and at least one component that carries out a periodic motion, comprising:

at least one storage for control data, the control data including:

first sets of control data for the drive motor, each of said first sets of control data being arranged to drive the motor at each of a plurality of angular speeds at a first defined torque;

second sets of control data for the drive motor, each of said second sets of control data being arranged to drive the motor at each of a plurality of angular speeds at a second defined torque; and at least third and fourth sets of control data for the drive motor, each of said at least third and fourth sets of control data being arranged to drive the motor at each of a plurality of angular speeds at least at respective third and fourth defined torques;

a detector for detecting an instantaneous angular speed of the drive motor; and a control unit for retrieving one of said sets of control data based on the instantaneous angular speed and a required torque, and for applying the retrieved set of control data to the motor.

11. Apparatus as claimed in claim 10, wherein the control unit includes means for detecting an instantaneous angular position of the drive motor, wherein the control data includes control data relating to the instantaneous angular positions of the drive motor, and wherein the control data relating to the instantaneous angular positions of the drive motor is stored in association with data concerning angular positions of the drive motor.

12. Apparatus as claimed in claim 10, wherein the control unit comprises means for detecting and storing an angular-speed value resulting from torque control.

13. Apparatus as claimed in claim 10, wherein the control unit is arranged to be switched as a start circuit.

14. Apparatus as claimed in claim 10, wherein the control unit is arranged to be switched as a shutoff circuit.

15. Apparatus as claimed in claim 10, wherein the machine that is driven is a weaving machine.

16. Apparatus as claimed in claim 10, wherein the drive motor is a switchable reluctance motor.

* * * * *

UNITED STATES PATENT AND TRADEMARK OFFICE
CERTIFICATE OF CORRECTION

PATENT NO.    : 6,707,267 B2
DATED         : March 16, 2004
INVENTOR(S)   : Walter Bilcke It is certified that error appears in the above-identified patent and that said Letters Patent is hereby corrected as shown below:

<u>Title page,</u>
Insert Item:
-- [30]    Foreign Application Priority Data
   Nov. 21, 1997    (BE) ............................. 9700936 --.

Signed and Sealed this

Third Day of August, 2004

JON W. DUDAS
*Acting Director of the United States Patent and Trademark Office*